United States Patent
Mei et al.

(10) Patent No.: US 11,537,005 B2
(45) Date of Patent: Dec. 27, 2022

(54) DISPLAY PANEL AND CONTROL METHOD THEREOF, AND DISPLAY DEVICE

(71) Applicant: WUHAN CHINA STAR OPTOELECTRONICS TECHNOLOGY CO., LTD, Hubei (CN)

(72) Inventors: Xindong Mei, Hubei (CN); Shaojun Hou, Hubei (CN); Chao Wang, Hubei (CN); Guanghui Liu, Hubei (CN)

(73) Assignee: WUHAN CHINA STAR OPTOELECTRONICS TECHNOLOGY CO., LTD, Hubei (CN)

( * ) Notice: Subject to any disclaimer, the term of this patent is extended or adjusted under 35 U.S.C. 154(b) by 294 days.

(21) Appl. No.: 16/769,621

(22) PCT Filed: Mar. 4, 2020

(86) PCT No.: PCT/CN2020/077761
§ 371 (c)(1),
(2) Date: Jun. 4, 2020

(87) PCT Pub. No.: WO2020/192373
PCT Pub. Date: Oct. 1, 2020

(65) Prior Publication Data
US 2021/0072599 A1    Mar. 11, 2021

(30) Foreign Application Priority Data

Mar. 26, 2019 (CN) .......................... 201910232120.7
Mar. 27, 2019 (CN) .......................... 201910239505.6
(Continued)

(51) Int. Cl.
G02F 1/13357 (2006.01)
G09G 3/34 (2006.01)
G02F 1/1335 (2006.01)

(52) U.S. Cl.
CPC .. *G02F 1/133608* (2013.01); *G02F 1/133528* (2013.01); *G02F 1/133603* (2013.01);
(Continued)

(58) Field of Classification Search
CPC ........ G02F 1/133601; G02F 1/133603; G09G 2310/0232
See application file for complete search history.

(56) References Cited

U.S. PATENT DOCUMENTS 6,700,557 B1 * 3/2004 McKnight ............ G09G 3/3611
345/94
2006/0044240 A1 * 3/2006 Takizawa ............... G09G 3/367
345/88
(Continued)

FOREIGN PATENT DOCUMENTS

CN    208384291 U    1/2019
CN    109379465 A    2/2019
(Continued)

*Primary Examiner* — Andrew J Coughlin
(74) *Attorney, Agent, or Firm* — PV IP PC; Wei Te Chung; Ude Lu

(57) ABSTRACT

The present invention provides a display panel and a control method thereof, and a display device. The display panel includes a display unit and a backlight module. The display unit includes a main display region and a function additional region. The backlight module includes a first light source block providing a light source for the main display region and a second light source block providing a light source for the function additional region. The first light source block and the second light source block are independently driven and controlled.

14 Claims, 19 Drawing Sheets

(30) Foreign Application Priority Data

May 28, 2019 (CN) .......................... 201910449306.8
Oct. 24, 2019 (CN) .......................... 201911019621.3

(52) U.S. Cl.
CPC .. *G02F 1/133611* (2013.01); *G02F 1/133615*
(2013.01); *G02F 1/133621* (2013.01); ***G09G
3/3406*** (2013.01); *G02F 1/133612* (2021.01);
*G09G 2320/0626* (2013.01)

(56) References Cited

U.S. PATENT DOCUMENTS

| | | | | |
|---|---|---|---|---|
| 2006/0232544 | A1* | 10/2006 | Sakashita | G09G 3/3648 345/102 |
| 2009/0201245 | A1* | 8/2009 | Nonaka | G02F 1/133621 345/102 |
| 2010/0207933 | A1* | 8/2010 | Suzuki | G02B 6/0078 362/613 |
| 2010/0220260 | A1* | 9/2010 | Sugita | G02F 1/133615 349/62 |
| 2011/0050668 | A1* | 3/2011 | Park | G09G 3/3426 345/84 |
| 2011/0241980 | A1* | 10/2011 | Lee | G02B 6/008 345/102 |

FOREIGN PATENT DOCUMENTS

| | | |
|---|---|---|
| CN | 109901327 A | 6/2019 |
| CN | 109976061 A | 7/2019 |
| CN | 110007501 A | 7/2019 |
| CN | 110187559 A | 8/2019 |
| CN | 110231735 A | 9/2019 |
| CN | 110471211 A | 11/2019 |
| CN | 110703499 A | 1/2020 |
| KR | 20090089623 A | 8/2009 |

* cited by examiner

DISPLAY PANEL AND CONTROL METHOD THEREOF, AND DISPLAY DEVICE

CROSS REFERENCE TO RELATED APPLICATIONS

This application claims priority to Chinese patent application No. 201911019621.3, titled "Display Panel and Control Method Thereof, and Display Device" filed on Oct. 24, 2019 with the National Intellectual Property Administration, which is incorporated by reference in the present application in its entirety.

FIELD OF INVENTION

The present invention relates to the field of display technology, and in particular, to a display panel, a control method thereof, and a display device.

BACKGROUND OF INVENTION

With increasing popularity of mobile portable devices, screens with high screen ratio have become a future development trend of electronic devices such as mobile phones and tablets because they can give users a better visual experience. Screen ratio is used to indicate a relative ratio of a screen to an area of a front panel of a mobile phone, and reflects users' visual experience on mobile devices. How to achieve a display effect of 100% screen ratio is a problem that the industry needs to solve urgently.

However, for the mobile devices such as mobile phones, in addition to display screens, some electronic components such as cameras, flashes, light sensors, etc. need to be placed on top of the front panel. These components need to be illuminated from the front of the panel. Because traditional screens will block the above electronic components, it is common practice in the industry to cut the front panel and cut out a portion of the screen to achieve light transmission, so as to ensure normal operation of the electronic components. While the above method destroys integrity of the entire screen, it also cannot achieve a full display of 100% screen ratio.

Another full-screen solution is to make the electronic components such as a front camera into a separate mechanical module as an independently controlled component, which is hidden inside a body by default. When users need to take pictures, videos, etc., the camera will automatically pop up or slide out manually in response to instructions of systems, which is the so-called "pop-up" or "slider" design. However, limited by mechanical structures, the camera's pop-up speed is slow, and opening speed lags behind traditional cameras. Secondly, because the mechanical structures are affected by assembly processes, there are gaps between pop-up function modules and a display panel body, which are susceptible to intrusion of powder and dust from outside. Furthermore, the mechanical structures of the pop-up design have a high failure rate, while the sliding-type design is prone to a problem of damage to cables caused by human force. Therefore, solutions of the above scheme still affect user experience of products.

Therefore, how to achieve full-screen display without destroying the screen integrity and without introducing new mechanical structures is an urgent problem in this field.

Technical Problem

How to achieve full-screen display without damaging screen integrity and introducing new mechanical structures.

Technical Solution

A display panel, comprising:
a display unit comprising a main display region and a function additional region, wherein at least a part of the function additional region is surrounded by the main display region, the main display region is a regular display region, and the function additional region is a transparent display region; and
a backlight module comprising a first light source block providing a light source for the main display region and a second light source block providing a light source for the function additional region, wherein the first light source block and the second light source block are independently driven and controlled.

Further, the display panel further comprises:
a backlight driving module electrically connected to the first light source block and the second light source block;
wherein the backlight driving module is used to control the first light source block to be turned on when a first control signal is received; and
wherein the backlight driving module is further used to control the second light source block to be turned on when a second control signal is received.

Further, the backlight driving module comprises a first driving module and a second driving module that are independent with each other;
the first driving module is electrically connected to the first light source block and is used to independently drive the first light source block according to the first control signal; and
the second driving module is electrically connected to the second light source block and is used to independently drive the second light source block according to the second control signal.

A display panel, comprising:
a display unit comprising a main display region and a function additional region, wherein at least a part of the function additional region is surrounded by the main display region; and
a backlight module comprising a first light source block providing a light source for the main display region and a second light source block providing a light source for the function additional region, wherein the first light source block and the second light source block are independently driven and controlled.

Further, the display panel further comprises:
a backlight driving module electrically connected to the first light source block and the second light source block;
wherein the backlight driving module is used to control the first light source block to be turned on when a first control signal is received; and
wherein the backlight driving module is further used to control the second light source block to be turned on when a second control signal is received.

Further, the backlight driving module comprises a first driving module and a second driving module that are independent with each other;
the first driving module is electrically connected to the first light source block and is used to independently drive the first light source block according to the first control signal; and
the second driving module is electrically connected to the second light source block and is used to independently drive the second light source block according to the second control signal.

Further, the display unit is disposed on the backlight module, the display unit comprises a first substrate and a second substrate disposed opposite to each other, and a liquid crystal layer disposed between the first substrate and the second substrate.

Further, the liquid crystal layer comprises a first liquid crystal layer disposed in the main display region and a second liquid crystal layer disposed in the function additional region, and liquid crystals in the second liquid crystal layer are scattering type liquid crystals.

Further, the display panel further comprises a screen driving module, wherein the screen driving module is used to control a rotation of the liquid crystals in the liquid crystal layer when a liquid crystal control signal is received.

Further, when the backlight driving module controls the second light source block to be turned off, the screen driving module controls the liquid crystals in the second liquid crystal layer to rotate to a transparent state; when the backlight driving module controls the second light source block to be turned on, the screen driving module controls the liquid crystals in the second liquid crystal layer to rotate to a scattering state.

Further, wherein the screen driving module is further used to send a feedback signal to the backlight driving module according to an actual display brightness of the display unit when the actual display brightness of the display unit is different from a default display brightness, and the backlight driving module adjusts a light emission brightness of the first light source block and/or the second light source block according to the received feedback signal.

Further, the display panel further comprises a printed circuit board electrically connected to the display unit, the backlight driving module is mounted on the printed circuit board and is electrically connected to the printed circuit board, so as to be electrically connected to signal lines in the display unit through the printed circuit board.

Further, the screen driving module is disposed at an edge region of the display unit, and the screen driving module is disposed close to the printed circuit board.

The present invention further provides a driving method of a display panel, wherein the display panel comprises:

a display unit comprising a main display region and a function additional region; and a backlight module comprising a first light source block providing a light source for the main display region and a second light source block providing a light source for the function additional region, wherein the first light source block and the second light source block are independently driven and controlled;

wherein the driving method comprises following steps of:

S10, controlling the first light source block to turn on when a backlight driving module receives a first control signal; and S20, controlling the second light source block to turn on when the backlight driving module receives a second control signal.

Further, in S20, when an electronic component corresponding to the function additional region is turned off and the function additional region is displaying, the backlight driving module receives the second control signal.

Further, the driving method further comprises following steps of:

S30, the backlight driving module receiving the third control signal and the backlight driving module controlling the second light source block to be turned off when the electronic component is turned on.

Further, the display panel further comprises a screen driving module, when the backlight driving module controls the second light source block to be turned off, the screen driving module controls liquid crystals in the second liquid crystal layer to rotate to a transparent state; when the backlight driving module controls the second light source block to be turned on, the screen driving module controls the liquid crystals in the second liquid crystal layer to rotate to a scattering state.

The present invention further provides a display device. The display device comprises:

an electronic component and a display panel, wherein the display panel comprises:

a display unit comprising a main display region and a function additional region, wherein at least a part of the function additional region is surrounded by the main display region; and a backlight module comprising a first light source block providing a light source for the main display region and a second light source block providing a light source for the function additional region, wherein the first light source block and the second light source block are independently driven and controlled;

wherein the electronic component is disposed corresponding to the function additional region of the display panel; when the electronic component is not operating and the second light source block is turned on, the function additional region displays a picture; when the electronic component is operating and the second light source block is turned off, the function additional region does not display the picture.

Further, the display device further comprises a central processing unit, wherein the central processing unit is electrically connected to the backlight driving module, and is used to send a second control signal to the backlight driving module when the electronic component is turned off and the function additional region is displaying.

Further, the central processing unit is further used to send a third control signal to the backlight driving module when the electronic component is turned on, and the third control signal is used to control the backlight driving module to turn off the second light source block.

Beneficial Effect

By setting a function additional region in a region opposite to electronic components, and using a first light source block and a second light source block to provide light sources for a main display region and the function additional region respectively, the function additional region can be switched between a transparent state and a screen display state, which can realize full-screen display effect without damaging screen integrity and introducing new mechanical structures. Meanwhile, the first light source block and the second light source block are independently controlled, so that the main display region and the function additional region can display at the same time. Moreover, it can also be that when the main display region displays normally, the function additional region does not display images, or when the function additional region displays the images normally, the main display region does not display the images.

DESCRIPTION OF DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

REFERENCE NUMERALS

10: display unit; 11: main display region; 12: function additional region; 13: first substrate; 14: second substrate; 15: liquid crystal layer; 151: first liquid crystal layer; 152: second liquid crystal layer; 16: upper polarizer; 17: lower polarizer; 18: partition; 20: backlight module; 21: first backlight region; 22: second backlight region; 221: light transmission region; 222: light source region; 223: transparent illuminated region; 224: non-transparent illuminated region; 23: first through hole; 24: reflective sheet; 25: light guide plate; 26: diffusion sheet; 27: backlight plate; 30: electronic component; 31: lens; 41: first light source block; 42: second light source block; 50: package cover; 60: optical glue; 70: second through hole; 81: central processing unit; 82: backlight driving module; 821: first driving module; 822: second driving module; 83: screen driving module; 84: printed circuit board; 90: light board.

DETAILED DESCRIPTION OF PREFERRED EMBODIMENTS

The following description of the various embodiments is provided with reference to the accompanying drawings. Directional terms, such as upper, lower, front, back, left, right, inner, outer, and lateral side, mentioned in the present invention are only for reference. Therefore, the directional terms are used for describing and understanding rather than limiting the present invention. In the figures, units having similar structures are used for the same reference numbers.

Figure 1:
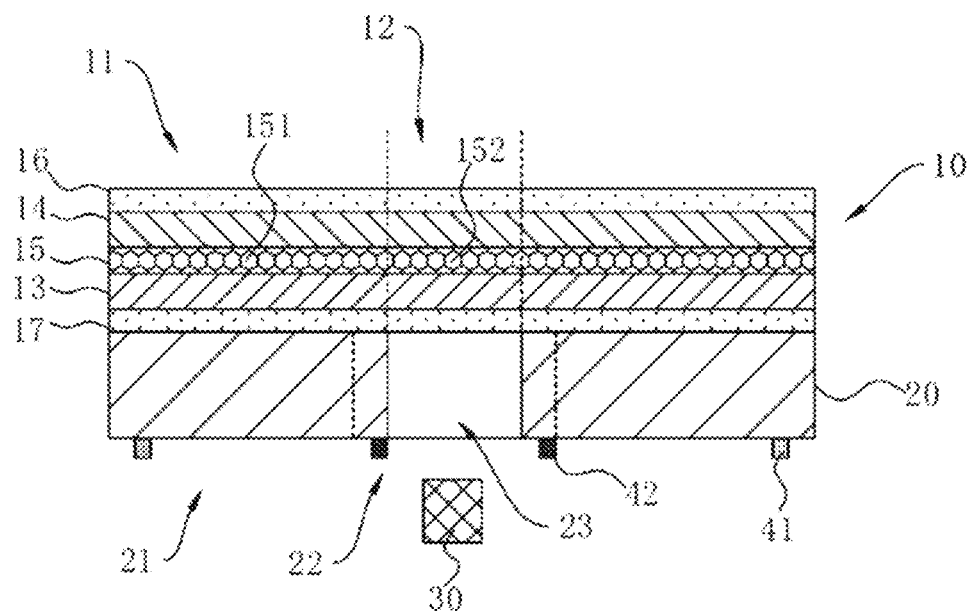
FIG. 1 is a schematic view of a display device according to Embodiment 1 of the present invention.
Figure 2:
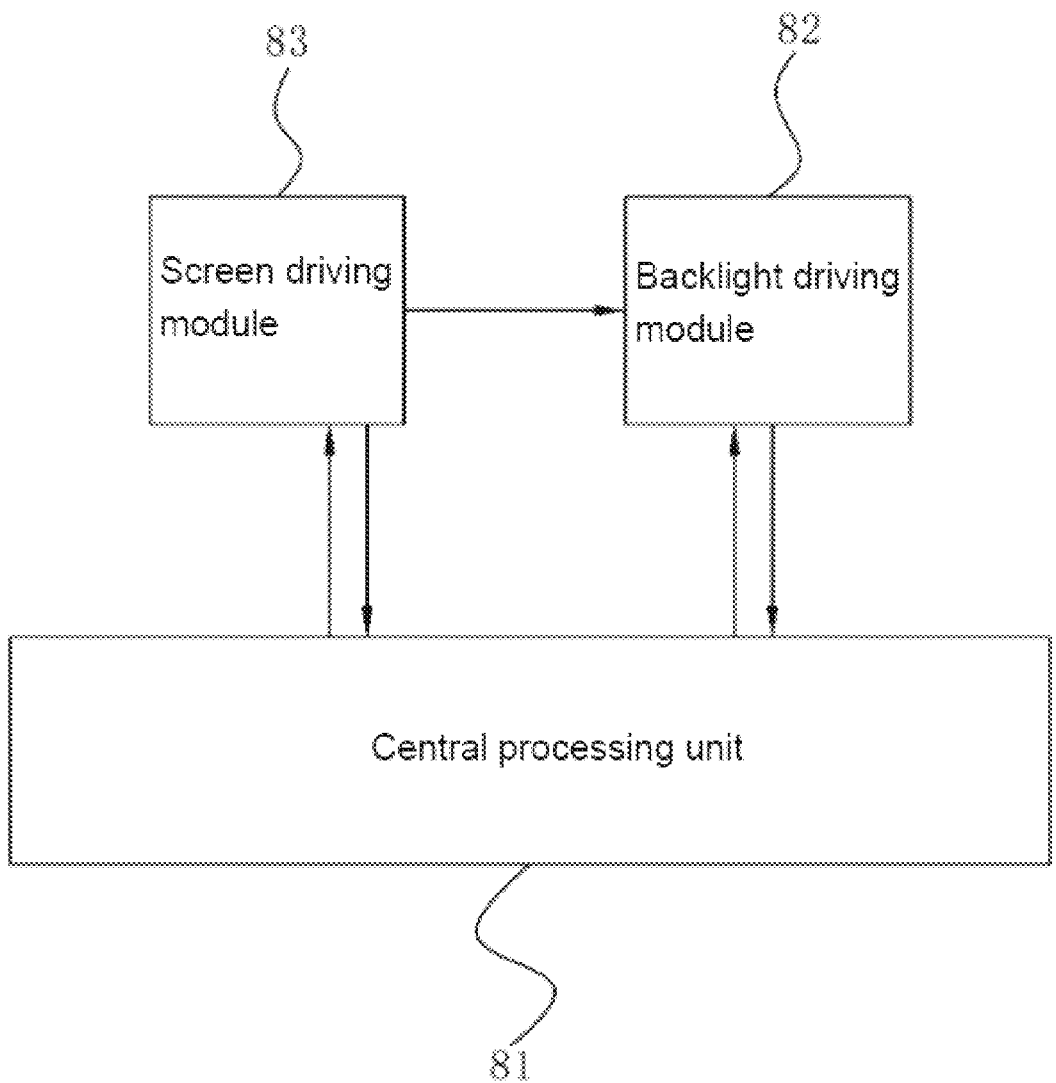
FIG. 2 is a schematic view of a driving module of a display panel according to an embodiment of the present invention.
Figure 3:
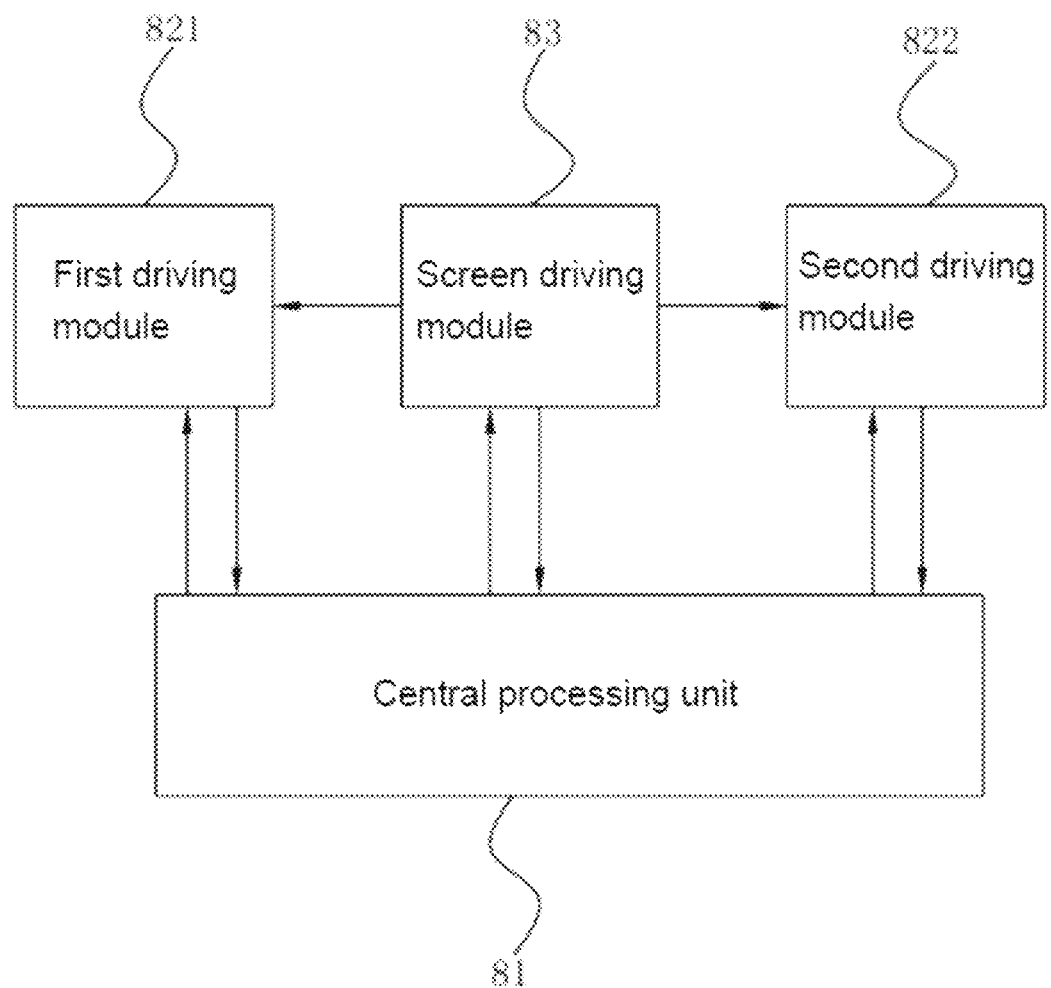
FIG. 3 is a schematic view of a driving module of a display panel according to another embodiment of the present invention.

A display panel, as shown in FIG. 1 to FIG. 3, the display panel comprises a display unit 10 and a backlight module 20.

Specifically, the display unit 10 is disposed on the backlight module 20 and is used to display images. The display unit 10 comprises a main display region 11 and a function additional region 12. At least a part of the function additional region 12 is surrounded by the main display region 11. The main display region 11 is a regular display region, and the function additional region 12 is a transparent display region.

The function additional region 12 is used for correspondingly arranging electronic components 30, and when the electronic components 30 are not operating, the main display region 11 and the function additional region 12 can be used for displaying images. When the electronic components 30 are operating, at this time, the main display region 11 can display images normally, and the function additional region 12 does not display images and is in a transparent state, so as to provide a lighting channel for the electronic components 30, thereby realizing function of the electronic components 30.

It should be noted that when the electronic components 30 are not operating, the main display region 11 and the function additional region 12 may display images together, or may display different images separately.

It should be noted that the display unit 10 according to the present invention may be a liquid crystal display unit.

Specifically, the backlight module 20 comprises a first light source block 41 providing a light source for the main display region 11 and a second light source block 42 providing a light source for the function additional region 12. The first light source block 41 and the second light source block 42 are independently driven and controlled, so that the first light source block 41 and the second light source block 42 independently provide the light sources for the main display region 11 and the function additional region 12.

It should be noted that independent control of the first light source block 41 and the second light source block 42 means that a switch control end of the first light source block 41 and a switch control end of the second light source block 42 are not electrically connected and are controlled separately. It means that the switch control end of the first light source block 41 and the switch control end of the first light source block 41 are two independently controlled switch control ends. That is, the switch control end of the first light source block 41 will not affect an on or off state of the second light source block 42 when controlling an on and off state of the first light source block 41. Similarly, when the switch control end of the second light source block 42 controls the second light source block 42 to be turned on and off, it will not affect the on or off state of the first light source block 41.

The first light source block 41 and the second light source block 42 are controlled independently from each other, so that the main display region 11 and the function additional region 12 can simultaneously display images; it can also be that when the main display region 11 displays normally, the function additional region 12 does not display the images, or when the function additional region 12 displays the images normally, the main display region 11 does not display the images.

Specifically, referring to FIG. 2, the display panel further comprises a backlight driving module 82 and a screen driving module 83.

Specifically, the backlight driving module 82 is electrically connected to the first light source block 41 and the second light source block 42 and is configured to control the first light source block 41 to be turned on when a first control signal is received. That is, the first light source block 41 is turned on through the switch control end of the first light source block 41.

The backlight driving module 82 is further configured to control the second light source block 42 to be turned on when a second control signal is received. That is, the second light source block 42 is turned on through the switch control end of the second light source block 42.

When only the main display region 11 is required for display, the backlight driving module 82 receives the first control signal, and the backlight driving module 82 controls the first light source block 41 to be turned on, and provides a light source for the main display region 11. When only the function additional region 12 is required for display, the backlight driving module 82 receives the second control signal, and the backlight driving module 82 controls the second light source block 42 to be turned on to provide a light source for the function additional region 12. When the main display region 11 and the function additional region 12 are required for display simultaneously, the backlight driving module 82 receives the first control signal and the second control signal at the same time, and the backlight driving module 82 controls the first light source block 41 and the second light source block 42 to be turned on at the same time.

Specifically, the backlight module 20 is provided with a first through hole 23 corresponding to the function additional region 12. The first through hole 23 passes through the backlight module 20 to provide a lighting channel for an electronic component 30 corresponding to the function additional region 12.

When the electronic component 30 is not operating, the second light source block 42 provides a light source for the function additional region 12 so that the main display region 11 and the function additional region 12 display images together. When the electronic component 30 is operating, the second light source block 42 is turned off, the function additional region 12 does not display images, and the first through hole 23 is used to provide the lighting channel for the electronic component 30.

Wherein, the second light source block 42 is disposed close to the first through hole 23.

Specifically, the backlight module 20 further comprises a first backlight region 21 for arranging the first light source block 41 and a second backlight region 22 for arranging the second light source block 42. At least a part of the second backlight region 22 is surrounded by the first backlight region 21, and the first through hole 23 is defined in the second backlight region 22.

Specifically, the display unit 10 comprises a first substrate 13 and a second substrate 14 opposite to each other, and a liquid crystal layer 15 disposed between the first substrate 13 and the second substrate 14.

The first substrate 13 may be an array substrate, and the second substrate 14 may be a color filter substrate.

Specifically, the display unit 10 further comprises a lower polarizer 17 disposed between the first substrate 13 and the backlight module 20, and an upper polarizer 16 disposed on a side of the second substrate 14 away from the liquid crystal layer 15.

In an embodiment, the liquid crystal layer 15 comprises a first liquid crystal layer 151 disposed in the main display region 11 and a second liquid crystal layer 152 disposed in the function additional region 12. Liquid crystals in the second liquid crystal layer 152 are scattering liquid crystals.

In an embodiment, the first liquid crystal layer 151 is disposed at the main display region 11, and the second liquid crystal layer 152 is correspondingly disposed at the function additional region 12. Specifically, the first liquid crystal layer 151 is disposed on other regions of the display unit 10 excluding the function additional region 12.

Specifically, the screen driving module 83 is configured to control a rotation of the liquid crystals in the liquid crystal layer 15 when a liquid crystal control signal is received.

Further, the first liquid crystal layer 151 and the second liquid crystal layer 152 are independent of each other and can be controlled independently by the screen driving module 83, so that the function additional region 12 and the main display region 11 can display images separately or simultaneously.

Further, when the backlight driving module 82 controls the second light source block 42 to be turned off, the screen driving module 83 controls the liquid crystals in the second liquid crystal layer 152 to rotate to a transparent state to provide the lighting channel for the lighting of the electronic component 30. When the backlight driving module 82 controls the second light source block 42 to be turned on, the screen driving module 83 drives the liquid crystals in the second liquid crystal layer 152 to rotate to a scattering state to scatter light emitted by the second light source block 42 so as to provide uniform illumination for images of the function additional region 12.

It should be noted that when the main display region 11 is required to display images, the backlight driving module 82 receives the first control signal. When the backlight driving module 82 controls the first light source block 41 to be turned on, the screen driving module 83 receives a corresponding liquid crystal control signal to control the liquid crystals in the first liquid crystal layer 151 to rotate to a display state, and thus to provide uniform illumination for images of the main display region 11.

In the embodiment, the first liquid crystal layer 151 may be conventional ordinary liquid crystals. The first liquid crystal layer 151 comprises a plurality of liquid crystal molecules, and the liquid crystal molecules comprise biphenyl liquid crystals, phenylcyclohexane liquid crystals, or ester liquid crystals. A material of the second liquid crystal layer 152 comprises scattering type liquid crystals. The scattering type liquid crystals comprise a plurality of liquid crystal molecules and a polymer, which can switch between a transparent state and a scattering state, and the polymer may be an ionic organic electrolyte material.

The liquid crystal molecules of the first liquid crystal layer 151 (i.e., the ordinary liquid crystals) are rotated after a voltage is applied. The screen driving module 83 controls rotation angles of the liquid crystal molecules by controlling a magnitude of an applied voltage, thereby controlling the light transmittance to achieve grayscale display. The second liquid crystal layer 152 (i.e., the scattering liquid crystals) has a different refractive index due to an addition of a polymer. The difference in refractive index between the liquid crystals and the polymer surface is controlled by the voltage, so that light is transmitted or scattered on the surface of the two, and thus the transparent state or the scattering state can be achieved. Light can be transmitted in the transparent state, while the scattering of the light in the scattering state can be realized, which is then used to display images.

The specific process of using the second liquid crystal layer 152 is: The liquid crystals and the polymer have a same anisotropic dielectric constant. When no voltage is applied or the voltage is lower than a threshold voltage, the liquid crystal molecules are aligned horizontally, and there is no refractive index difference with the polymer material inside, so no scattering occurs. When the applied voltage is higher than the threshold voltage, the liquid crystal molecules rotate and their directions are aligned along the vertical direction, which changes the anisotropic characteristics of the dielectric constant of the liquid crystals. Therefore, the refractive index difference occurs on the surface of the liquid crystals and the polymers, and the light is scattered there as observed.

In an embodiment, the electronic component 30 comprises one or a combination of a camera, a flash, a light sensor, a breathing light sensor, a distance sensor, a fingerprint scanner sensor, a microphone sensor, and a transparent antenna sensor.

It should be noted that taking the electronic component 30 as a camera as an example, when the camera is not required to operate, the camera is turned off at this time, and the display unit 10 is in a image display state for displaying images.

When the main display region 11 and the function additional region 12 are required to display at the same time, the backlight driving module 82 receives the first control signal and the second control signal, and the screen driving module 83 receives the corresponding liquid crystal control signal. At this time, the backlight driving module 82 controls the first light source block 41 and the second light source block 42 to be turned on at the same time. The first light source block 41 provides the light source for the display of the main display region 11, and the second light source block 42 provides the light source for the display of the function additional region 12. Currently, the screen driving module 83 controls the rotation of the liquid crystals in the liquid crystal layer 15 so that the liquid crystals in the first liquid crystal layer 151 are in the display state, and the liquid crystals in the second liquid crystal layer 152 are in the scattering state. The main display region 11 and the function additional region 12 display images together, and the display unit 10 is in a full-screen display state.

When the second light source block 42 is on and the camera is required to operate, the backlight driving module 82 receives a third control signal. The backlight driving module 82 controls the second light source block 42 to turn off, the first light source block 41 works normally, and the screen driving module 83 controls the liquid crystals in the second liquid crystal layer 152 to rotate to the transparent state. At this time, the main display region 11 displays normally, and the function additional region 12 is transparent. Outside light enters the camera through the function additional region 12 and the first through hole 23 to complete a camera operation.

By arranging the function additional region 12 in the region corresponding to the electronic component 30, the second light source block 42 is used to provide the light source for the function additional region 12, the backlight driving module 82 is used to control the on and off of the first light source block 41 and the second light source block 42 separately, and the screen driving module 83 is used to switch the transparent state and the scattering state of the liquid crystals in the second liquid crystal layer 152 according to demand, so as to realize the switching of the transparent state and the image displaying state of the function additional region 12. This can achieve full-screen display without damaging screen integrity and introducing new mechanical structures.

It should be noted that the function additional region 12 may be disposed at any position on the display unit 10. A shape of the function additional region 12 is any one of bangs, widow's peak, waterdrop, circular, triangular, rectangular, or polygonal.

Specifically, when an actual display brightness of the display unit 10 is different from the preset display brightness, the screen driving module 83 may further send a feedback signal to the backlight driving module 82 according to the actual display brightness of the display unit 10. The backlight driving module 82 adjusts the light emission brightness of the first light source block 41 and/or the second light source block 42 according to the received feedback signal.

It should be noted that the liquid crystal control signal received by the screen driving module 83 comprises information such as the preset brightness of the image that the display unit 10 needs to display. When information such as the brightness of the image actually displayed in the main display region 11 and/or the function additional region 12 in the display unit 10 does not match the preset brightness, the screen driving module 83 sends the feedback signal to the backlight driving module 82. The backlight driving module 82 controls the corresponding light source block to adjust the light emission brightness, so that the brightness of the actual displayed image at the corresponding region is consistent with the preset brightness.

In an embodiment, referring to FIG. 3, the backlight driving module 82 comprises a first driving module 821 and a second driving module 822 that are independent of each other. The first driving module 821 is configured to receive the first control signal and is electrically connected to the first light source block 41, and the second driving module 822 is configured to receive the second control signal and is electrically connected to the second light source block 42.

The first light source block 41 and the second light source block 42 are controlled by the independent first driving module 821 and the second driving module 822, so that the main display region 11 and the function additional region 12 can display simultaneously or separately. Therefore, the control of the first light source block 41 and the second light source block 42 is more independent and simpler, and the control of the first light source block 41 and the second light source block 42 is prevented from affecting each other.

It should be noted that in actual implementation, the first light source block 41 and the second light source block 42 can also be controlled by a driving module.

Figure 4:
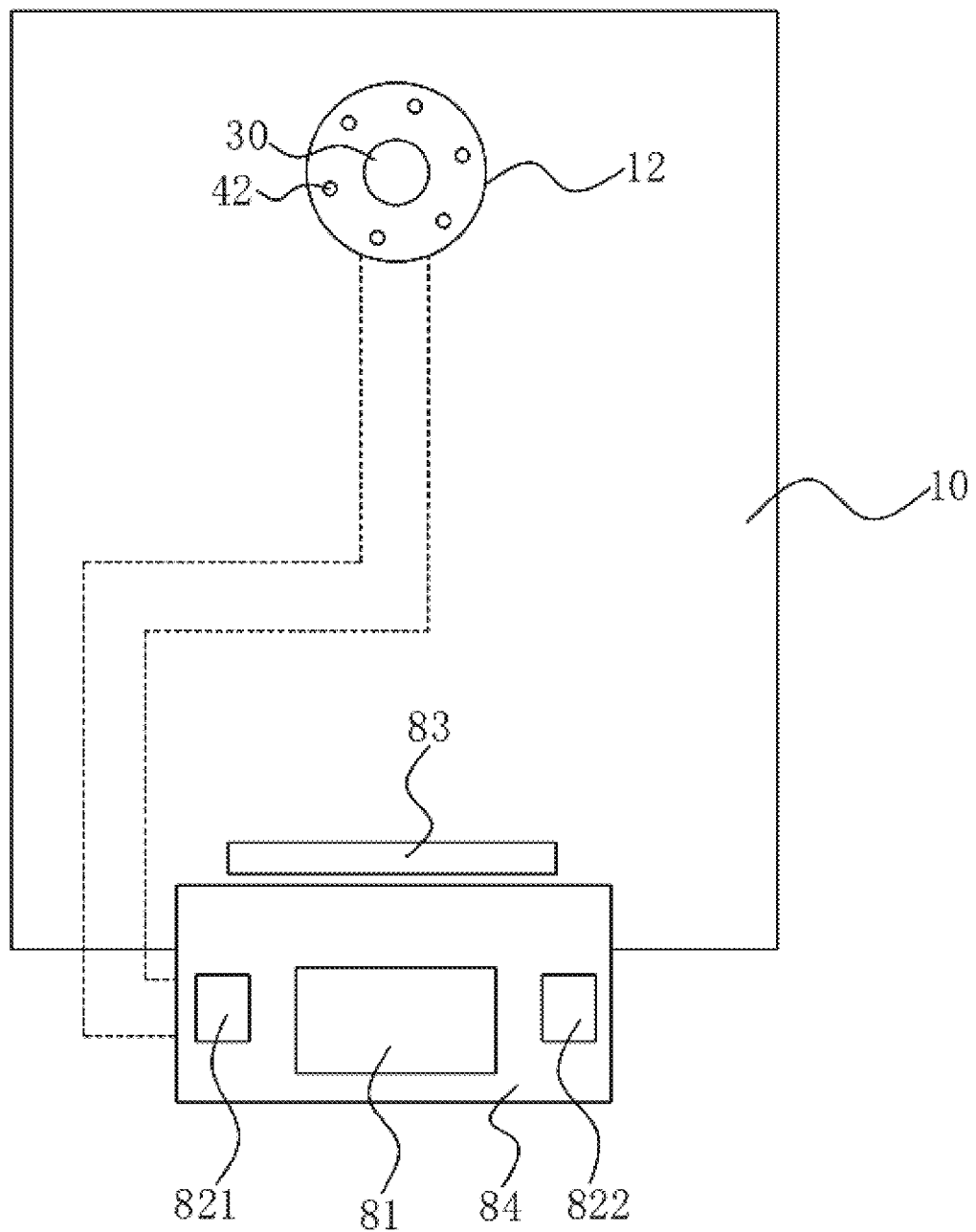
FIG. 4 is a schematic structural view of a display panel according to an embodiment of the present invention.

In an embodiment, as shown in FIG. 4, the display panel further comprises a printed circuit board 84 electrically connected to the display unit 10. The backlight driving module 82 is mounted on the printed circuit board 84 and is electrically connected to the printed circuit board 84 to be electrically connected to signal lines in the display unit 10 through the printed circuit board 84.

Control elements such as the backlight driving module 82 are mounted on the printed circuit board 84. The printed circuit board 84 may be electrically connected to the signal lines (such as scanning lines and data lines) on the display unit 10 through metal traces, so as to transmit signals from the control elements to the display unit 10.

It should be noted that the printed circuit board 84 may be a flexible printed circuit board. Therefore, after the control elements such as the backlight driving module 82 are mounted on the printed circuit board 84, the printed circuit board 84 is bent to bend the control elements such as the backlight driving module 82 to a side of the display unit 10 near the backlight module 20.

In an embodiment, the screen driving module 83 is disposed at an edge region of the display unit 10, and the screen driving module 83 is disposed near the printed circuit board 84.

It should be noted that, in actual implementation, the screen driving module 83 may also be mounted on the printed circuit board 84.

It should be noted that the screen driving module 83 can be electrically connected to pixel driving electrodes in the display unit 10 through the printed circuit board 84, so as to drive and control the rotation of the liquid crystals.

Embodiment 2

Figure 5:
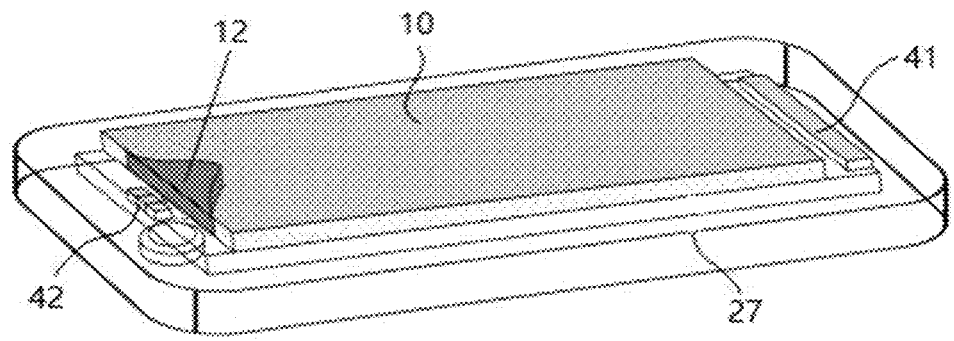
FIG. 5 is a perspective structural view of a display device according to Embodiment 2 of the present invention.
Figure 6:
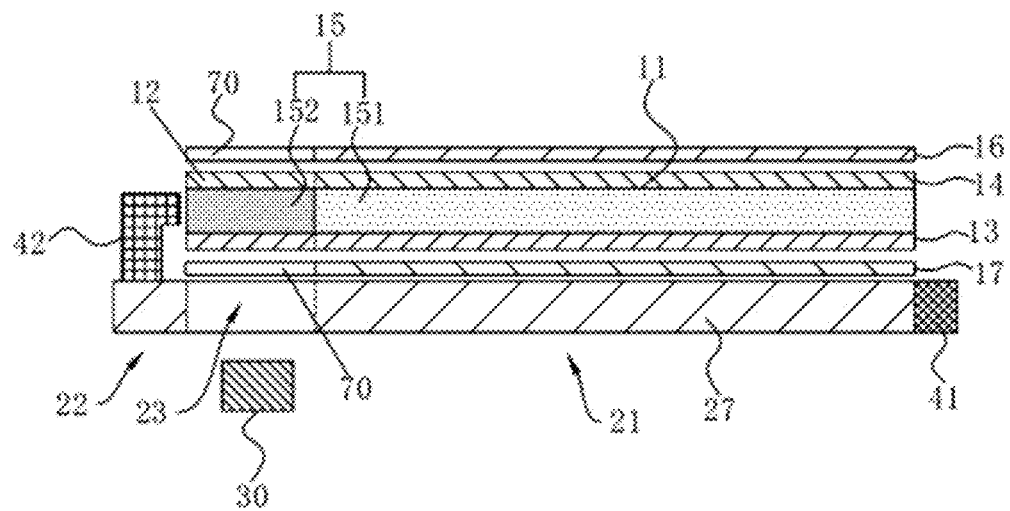
FIG. 6 is a cross-sectional view of the display device according to Embodiment 2 of the present invention.
Figure 7:
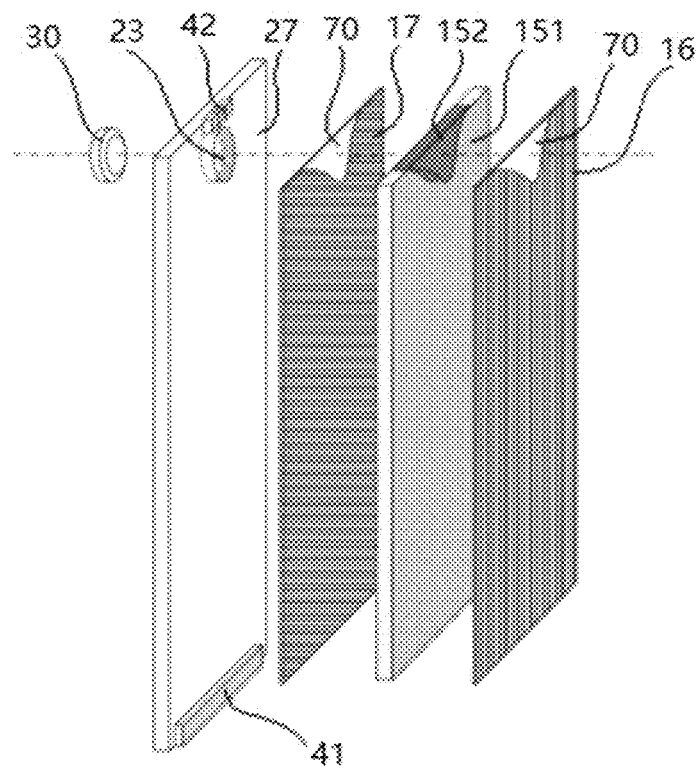
FIG. 7 is a partially exploded schematic view of the display device according to Embodiment 2 of the present invention.

A display panel, as shown in FIG. 5 to FIG. 7, is different from Embodiment 1 in that the function additional region 12 is disposed at an edge of the display unit 10, and the second light source block 42 is disposed at a side of the first through hole 23 and is close to the function additional region 12. The second light source block 42 is used to laterally provide light to the function additional region 12 to prevent the second light source block 42 from affecting a display and light transmission of the function additional region 12.

Further, the second light source block 42 is disposed on a side of the display unit 10 and is close to the function additional region 12.

Specifically, the backlight module 20 comprises a backlight plate 27. The first through hole 23 is disposed on the backlight plate 27, and the first light source block 41 is disposed on a side of the backlight plate 27 near an edge of the display unit 10.

It should be noted that the backlight plate 27 may comprise optical films such as a reflection sheet 24, a light guide plate 25, and a diffusion sheet 26.

In an embodiment, the first light source block 41 is disposed away from the first through hole 23. The first light source block 41 comprises a white light source for providing a light source to a first liquid crystal layer 151. The second light source block 42 is disposed near the first through hole 23. The second light source block 42 comprises three RGB color light sources for providing a light source to a second liquid crystal layer 152 correspondingly disposed at the function additional region 12 to display colored images.

Further, a distance between the second light source block 42 and the first through hole 23 is less than a distance between the first light source block 41 and the first through hole 23.

In an embodiment, the first light source block 41 and the second light source block 42 are respectively disposed at two ends of the backlight plate 27.

It should be noted that, referring to FIG. 7, in a specific implementation, the first light source block 41 can be placed on a bottom end of the backlight plate 27 to give light laterally, and the second light source block 42 may be placed on a top side of the backlight plate 27 to give light laterally. It is a preferred method to place the second light source block 42 on the top of the backlight plate 27, and other embodiments are protected by this patent.

Specifically, a lower polarizer 17 and an upper polarizer 16 are provided with second through holes 70 at positions corresponding to the function additional region 12.

It can be understood that the lower polarizer 17 and the upper polarizer 16 are disposed on two sides of the first liquid crystal layer 151, respectively, and their functions are to provide linearly polarized light and realize brightness and darkness change of the display screen of the first liquid crystal layer 151. Holes are dug in the lower polarizer 17 and the upper polarizer 16 corresponding to the first through hole 23, that is, the second through holes 70 are arranged to form a region without polarizing function to ensure light transmission ability of the second liquid crystal layer 152 in a transparent state.

In an embodiment, an area of the first through hole 23 is less than an area of the second through holes 70. This arrangement can ensure that the second liquid crystal layer 152 can completely display without being blocked.

Embodiment 3

Figure 8:
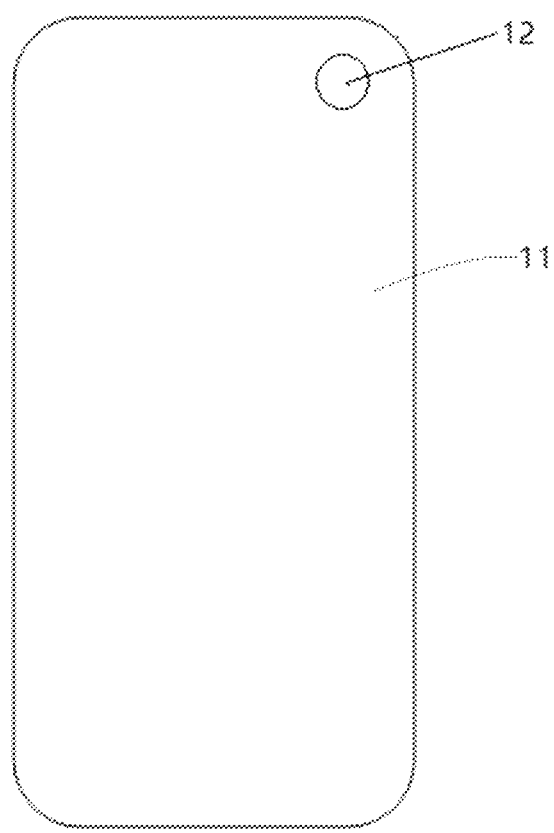
FIG. 8 is a schematic plan structural view of a display device according to Embodiment 3 of the present invention.
Figure 9:
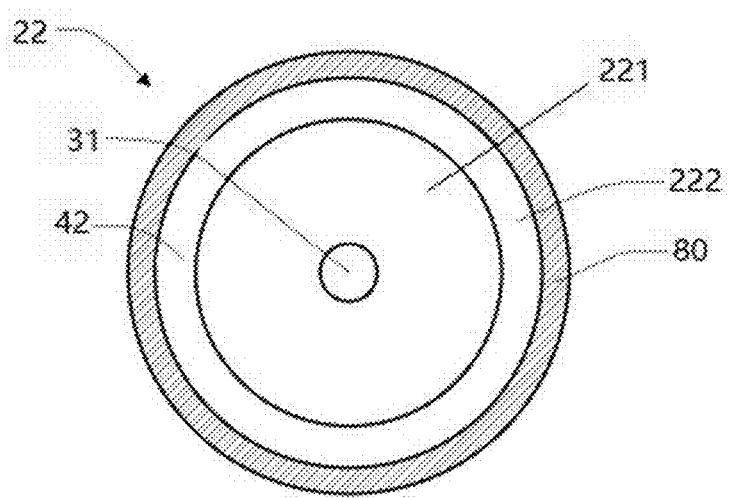
FIG. 9 is a schematic structural view of a second backlight region according to Embodiment 3 of the present invention.
Figure 10:
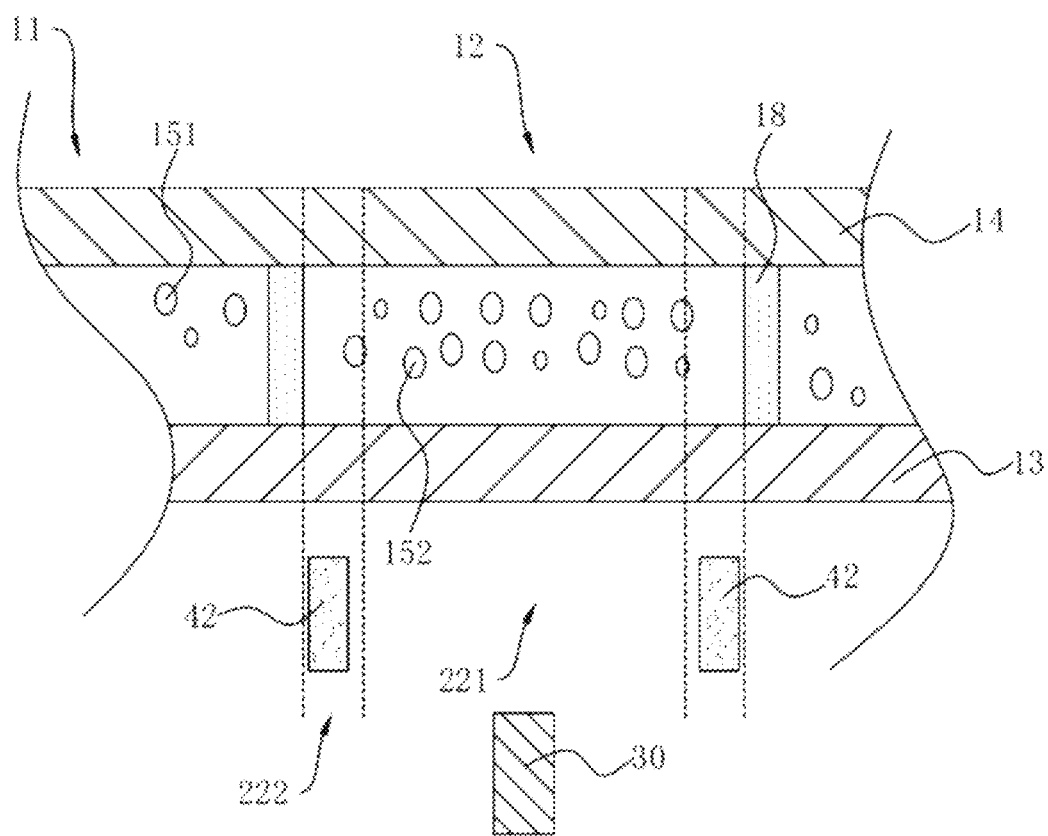
FIG. 10 is a schematic structural view of the display device according to Embodiment 3 of the present invention.
Figure 11:
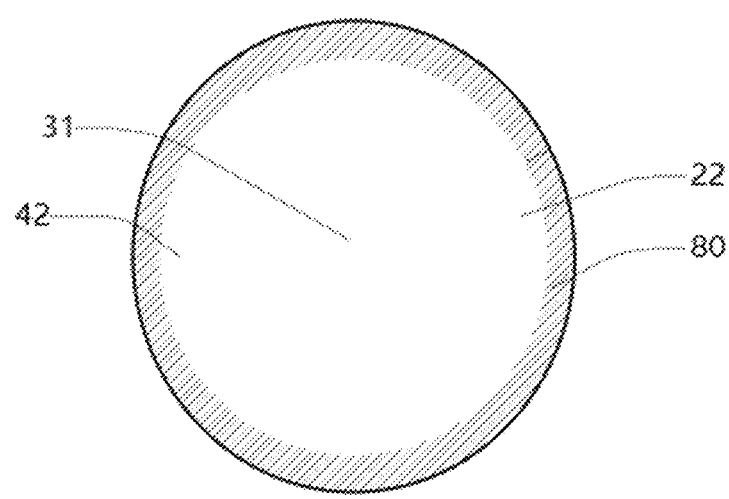
FIG. 11 is another schematic structural view of the second backlight region according to Embodiment 3 of the present invention.
Figure 12:
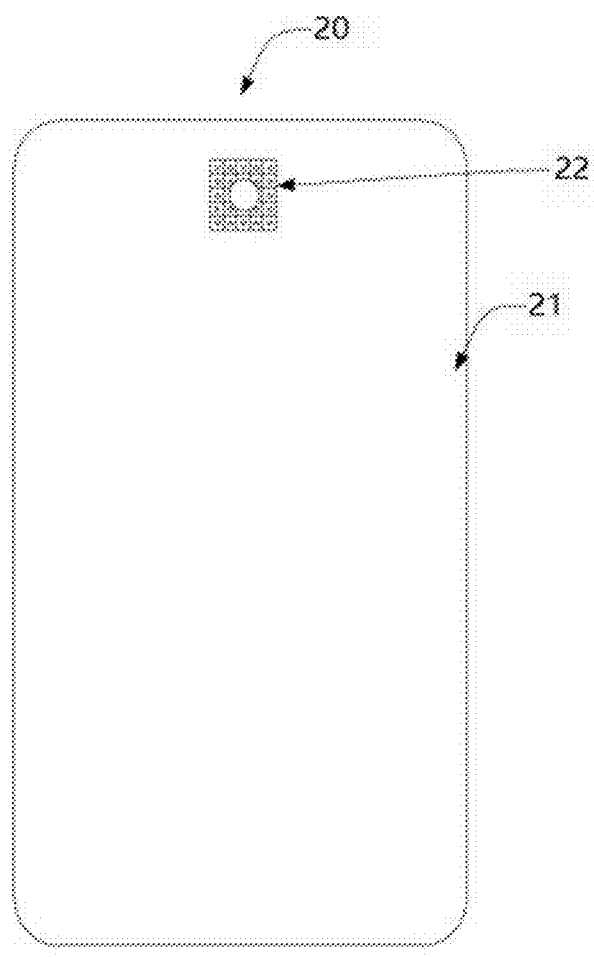
FIG. 12 is a schematic plan view of a display device according to Embodiment 4 of the present invention.
Figure 13:
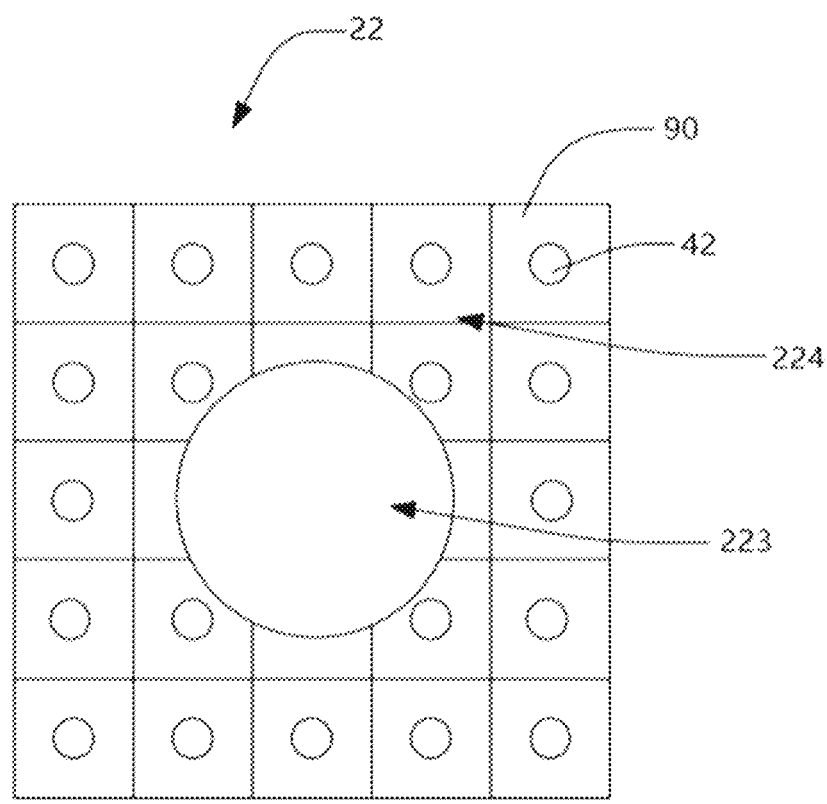
FIG. 13 is a schematic structural view of a second backlight region according to Embodiment 4 of the present invention.
Figure 14:
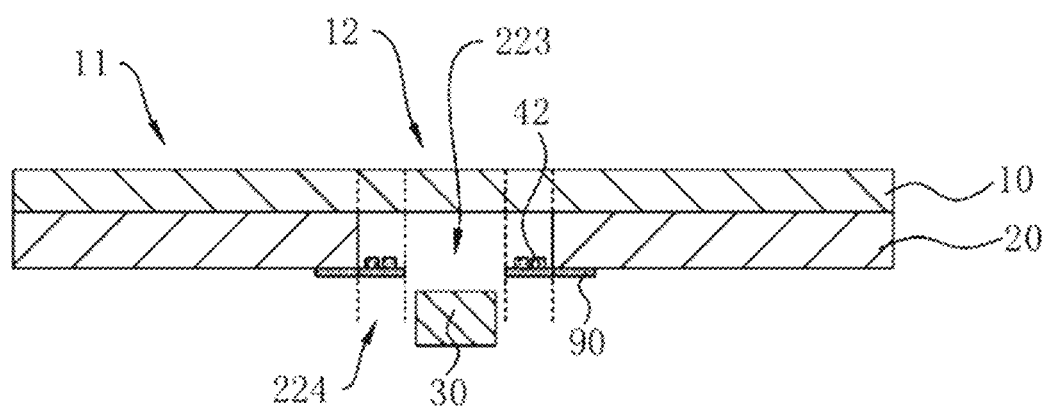
FIG. 14 is a schematic view of a first structure of the display device according to Embodiment 4 of the present invention.

A display panel, as shown in FIG. 8 to FIG. 10, is different from Embodiment 1 in that the second light source block 42 is disposed around the first through hole 23.

Wherein, the function additional region 12 may be disposed at any position on the display unit 10. The function additional region 12 can realize both a shooting effect and a display effect.

In an embodiment, taking the electronic component 30 as a camera as an example, a shape of the function additional region 12 is circular, and the electronic component 30 comprises a lens 31. A shape of the lens 31 is circular corresponding to the function additional region 12.

When the function additional region 12 performs shooting processing, the lens 31 is used to obtain the light incident on the function additional region 12 so that the camera can realize imaging. The lens 31 is disposed at a center of the function additional region 12, and a center axis of the lens 31 is disposed on a same line as a center axis of the function additional region 12. The function additional region 12 and the lens 31 are both circular, and an edge of the lens 31 and an edge of the function additional region 12 form a concentric circular structure.

Specifically, the second backlight region 22 comprises a light transmitting region 221 corresponding to the first through hole 23 and a light source region 222 provided around the light transmitting region 221. The second light source block 42 is disposed in the light source region 222.

In an embodiment, the light source region 222 is in a circular shape, is disposed in the second backlight region 22, and is connected to the first backlight region 21. The light source region 222 comprises an inner circular edge and an outer circular edge, and the outer circular edge is connected to the first backlight region 21. A surface of the light source region 222 is silver-plated. A size of a diameter of the inner circular in the light source region 222 corresponds to a size of a diameter of the light transmitting region 221, and a size of a diameter of the outer circular of the light source region 222 corresponds to a size of a circle surrounded by the first backlight region 21.

In an embodiment, the second light source block 42 comprises a ring-shaped light source disposed around the light-transmitting region 221.

In another embodiment, the second light source block 42 comprises at least two light sources disposed around the first through hole 23, and the light sources are evenly distributed.

Two or more light sources are evenly distributed in the light source region 222 and protrude from the surface of the light source region 222 to ensure that light beams emitted by the second light source block 42 can provide a uniform light source for the function additional region 12. It prevents bright or dark regions from appearing in the function additional region 12, ensures uniform and clear display, and improves the display quality of the display panel. The second light source block 42 is an LED lamp or a mini LED lamp bead.

When the function additional region 12 of the display panel is used for displaying, the second light source block 42 emits light to illuminate all the regions of the function additional region 12 so that the function additional region 12 can display images and display pictures together with the main display region 11. Currently, the screen reaches full-screen display. The light beam emitted by the second light source block 42 uniformly provides light to the function additional region 12 to prevent problems such as inconsistency and unevenness of light in the function additional region 12.

In addition, since design circuits of the function additional region 12 is different from design circuits of the main display region 11, in designing the circuits of the function additional region 12, an amount of light transmitted can be changed by adjusting panel voltages, and an amount of light transmitted can be changed to change brightness of the display, which can improve display quality of the display panel.

In an embodiment, the number of light sources comprised in the second light source block 42 is preferably 4, 6, or 8. Those skilled in the art may also set the number of light sources according to the size of the distribution range of the light source region 222.

In an embodiment, a partition 18 is provided between the main display region 11 and the function additional region 12. The partition 18 is a circular ring surrounded by a transparent optical glue 60 to isolate a first liquid crystal layer 151 and a second liquid crystal layer 152. In this way, the light of the second light source block 42 disposed in the light source region 222 can also cover the partition 18, preventing the problem of dark regions in the partition 18, and improving display quality of the display panel.

It should be noted that the transparent optical glue 60 has strong adhesiveness and is provided between the first substrate 13 and the second substrate 14, and can be used to fix the first substrate 13 and the second substrate 14.

In an embodiment, the lens 31 and the second light source block 42 are both disposed below the first substrate 13. A center axis of the lens 31 is on a same line as a center axis of the function additional region 12. The second light source block 42 provides a light source for the function additional region 12 so that light enters the function additional region 12 from different angles. The light in the function additional region 12 is evenly distributed, sharpness of the display screen is improved, and display quality of the display panel is guaranteed.

It should be noted that the second light source block 42 may be disposed on a peripheral side of the first through hole 23 or may be disposed at a region corresponding to the first through hole 23.

As shown in FIG. 8 to FIG. 10, the second light source block 42 protrudes from the surface of the light source region 222. Light of each second light source block 42 is evenly diffused to various angles, so that the light enters the function additional region 12 from different angles. It makes the light in the function additional region 12 evenly distributed, improves sharpness of the display screen, and ensures display quality of the display panel.

Embodiment 4

A display panel, as shown in FIG. 11 to FIG. 14, is different from Embodiment 1 in that: the second light source block 42 is disposed around the first through hole 23 and is disposed on a side of the backlight module 20 away from the display unit 10 so as to provide a uniform light source for the function additional region 12 corresponding to the first through hole 23.

Specifically, the second light source block 42 comprises a light board 90 and at least one light source disposed on the light board 90.

The second backlight region 22 comprises a transparent illuminated region 223 and a non-transparent illuminated region 224. The non-transparent illuminated region 224 is provided around the transparent illuminated region 223, and the transparent illuminated region 223 corresponds to the function additional region 12. The function additional region 12 may be disposed at any position on the display unit 10.

It should be noted that the first through hole 23 corresponds to the transparent illuminated region 223. A region where the second light source block 42 is disposed corresponds to the non-transparent illuminated region 224, and a region corresponding to the first through hole 23 and a region where the second light source block 42 is disposed together form the second backlight region 22.

The first through hole 23 passes through the backlight module 20, and a shape of the first through hole 23 may be square or circular.

In an embodiment, the second light source block 42 comprises a plurality of light sources. The light sources in the second light source block 42 are distributed in an array on the light board 90, and the plurality of light sources are distributed around the first through hole 23.

It should be noted that the light source may be a mini LED lamp bead.

In an embodiment, a shape of the light board 90 is circular or square, and a shape of the transparent illuminated region 223 is circular.

A direction of light emitted by the mini LED lamp beads in the non-transparent illuminated region 224 is adjustable. It is preferable to ensure that the transparent illuminated region 223 obtains a uniform light source, so as to achieve a normal display of the transparent illuminated region in the display mode.

When lighting in the second backlight region 22, light sources of the mini LED lamp beads are turned off to prevent affecting collection of the electronic components 30.

When the electronic component 30 is not operating, the second light source block 42 provides a light source for the function additional region 12 so that the main display region 11 and the function additional region 12 display images together, thereby entering a full-screen display state.

Figure 15:
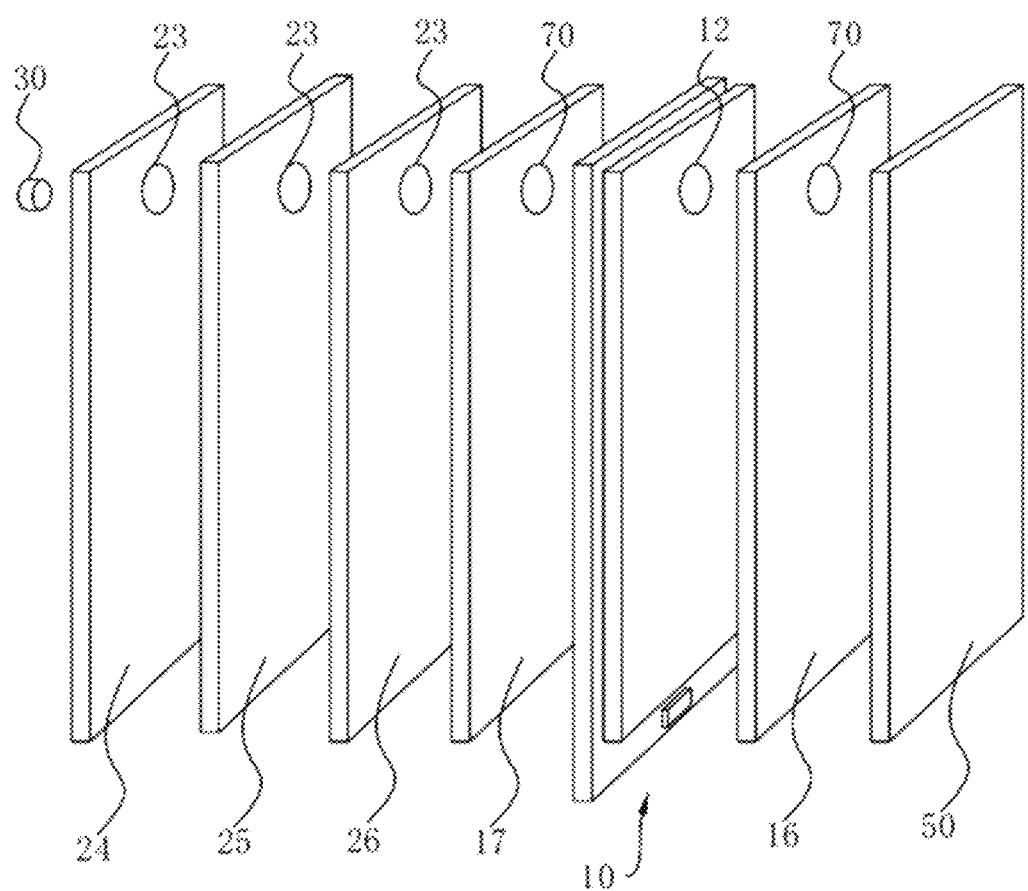
FIG. 15 is a partially exploded schematic view of the display device according to Embodiment 4 of the present invention.
Figure 16:
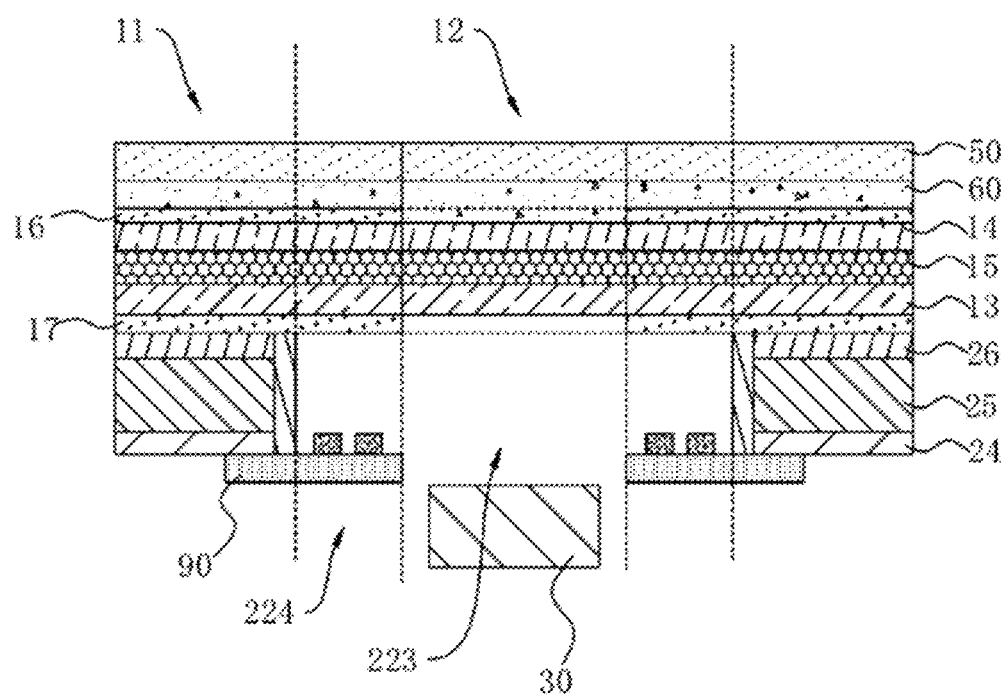
FIG. 16 is a schematic view of a second structure of the display device according to Embodiment 4 of the present invention.

In an embodiment, as shown in FIG. 15 and FIG. 16, the backlight module 20 comprises a reflection sheet 24, a light guide plate 25, and a diffusion sheet 26 disposed in order.

It should be noted that the second light source block 42 is disposed corresponding to the first through hole 23 and is disposed on a side of the first through hole 23 away from the display unit 10. The second light source block 42 may be a side-type light source or a direct-type light source. In actual implementation, the backlight module 20 may further comprise a back frame and a plastic frame.

When the second light source block 42 is the side-type light source, the second light source block 42 may be one or more mini LED beads or LEDs disposed on a side of the backlight module 20. When the second light source block 42 is the direct-type light source, the second light source block 42 may be a plurality of mini LED lamp beads or LEDs evenly distributed in the first backlight region 21.

The light guide plate 25 is provided on the reflection sheet 24; the diffusion sheet 26 is provided on a side of the light guide plate 25 away from the reflection sheet 24.

A combination of the light guide plate 25 and the diffusion sheet 26 is mainly for diffusing the light of the first light source block 41 to the display unit 10 to improve brightness of the display unit 10.

Wherein, a lower polarizer 17 and an upper polarizer 16 are provided with a second through hole 70 at a position corresponding to the function additional region 12.

It can be understood that the lower polarizer 17 and the upper polarizer 16 are disposed on two sides of the first liquid crystal layer 151, respectively, and their functions are to provide linearly polarized light and realize brightness and darkness change of the display screen of the first liquid crystal layer 151. Holes are dug in the lower polarizer 17 and the upper polarizer 16 corresponding to the first through hole 23, that is, the second through hole 70 is arranged to form a region without polarizing function to ensure light transmission ability of the second liquid crystal layer 152 in a transparent state.

In an embodiment, a package cover 50 is further provided on a side of the upper polarizer 16 away from the liquid crystal layer 15. The packaging cover 50 is bonded to the upper polarizer 16 through an optical glue layer 60. The packaging cover 50 may be a transparent glass cover or a transparent plastic cover.

The second backlight region 22 on the backlight module 20 is used to dig holes, and then the light plate 90 and the second light source block 42 are provided around the transparent illuminated region 223. An electronic component 30 is disposed below the transparent illuminated region 223 to form a complete display device. In a display mode, the function additional region 12 obtains a uniform light source, so that the function additional region 12 can display normally when the display device is in the display mode, so as to achieve a real screen ratio. When the electronic component 30 is in a lighting mode, the second light source block 42 is turned off to prevent the electronic component 30 from being affected by lighting.

Based on the above display panel, the present invention further provides a driving method of a display panel for driving the display panel according to any one of Embodiment 1 to Embodiment 4, the display panel comprising:

a display unit 10 comprising a main display region 11 and a function additional region 12; and a backlight module 20 comprising a first light source block 41 providing a light source for the main display region 11 and a second light source block 42 providing a light source for the function additional region 12, wherein the first light source block 41 and the second light source block 42 are independently driven and controlled.

The driving method comprises following steps of:

S10, controlling the first light source block 41 to turn on when a backlight driving module 82 receives a first control signal; and S20, controlling the second light source block 42 to turn on when the backlight driving module 82 receives a second control signal.

Further, in step S10, when the main display region 11 is required to perform display, the backlight driving module 82 receives the first control signal.

Further, in step S20, when the electronic component 30 is turned off and the function additional region 12 is displaying, the backlight driving module 82 receives the second control signal.

Wherein, when the function additional region 12 is required for display, the electronic component 30 is in a closed state at this time. The backlight driving module 82 receives the second control signal. The backlight driving module 82 controls the second light source block 42 to be turned on to provide a light source for the function additional region 12, and the function additional region 12 displays normally.

It should be noted that the main display region 11 and the function additional region 12 can simultaneously display images; it can also be that when the main display region 11 displays normally, the function additional region 12 does not display the images, or when the function additional region 12 displays the images normally, the main display region 11 does not display the images.

Specifically, the driving method of the display panel further comprises:

S30, the backlight driving module 82 receiving the third control signal and the backlight driving module 82 controlling the second light source block 42 to be turned off when the electronic component 30 is turned on.

Specifically, when the backlight driving module 82 controls the second light source block 42 to be turned off, the screen driving module 83 controls the liquid crystals in the second liquid crystal layer 152 to rotate to a transparent state. When the backlight driving module 82 controls the second light source block 42 to be turned on, the screen driving module 83 controls the liquid crystals in the second liquid crystal layer 152 to rotate to a scattering state, so that the function additional region 12 is in a display state.

Based on the above display panel, the present invention further provides a display device comprising the display panel according to any one of Embodiment 1 to Embodiment 4.

The display device further comprises an electronic component 30, and the electronic component 30 is disposed corresponding to the function additional region 12 of the display panel. When the second light source block 42 is turned on, the electronic component 30 does not operate, and the function additional region 12 displays images. When the second light source block 42 is turned off, the electronic component 30 operates, the function additional region 12 does not display the images, and the main display region 11 can display the images normally.

When the main display region 11 is required for display, the backlight driving module 82 receives the first control signal. The backlight driving module 82 controls the first light source block 41 to be turned on, and provides a light source for the main display region 11. When the function additional region 12 is required for display, the backlight driving module 82 receives a second control signal to control the second light source block 42 to turn on, and provides a light source for the function additional region 12.

Specifically, a central processing unit 81 is electrically connected to the backlight driving module 82, and is configured to send the control signals to the backlight driving module 82 to control the backlight driving module 82.

Further, the central processing unit 81 is configured to send the second control signal to the backlight driving module 82 when the electronic component 30 is turned off and the function additional region 12 is displaying.

It should be noted that when the electronic component 30 is not operating, the function additional region 12 can be used for normally displaying the images at this time. That is, the second light source block 42 can be turned on at this time, and an on and off state of the electronic component 30 can also be controlled by the central processing unit 81.

Further, the central processing unit 81 is further configured to send a third control signal to the backlight driving module 82 when the electronic component 30 is turned on. The third control signal is used to control the backlight driving module 82 to turn off the second light source block 42.

When the electronic component 30 is turned on, the function additional region 12 is transparent for providing a lighting channel for the electronic component 30. At this time, the second light source block 42 needs to be turned off to prevent light emitted by the second light source block 42 from affecting the electronic component 30 to collect external light.

It should be noted that when the electronic component 30 is turned off or on, the main display region 11 can be used for display. That is, the first light source blocks 41 may be in an on state.

It should be noted that after receiving the corresponding control signal, the backlight driving module 82 may also feedback a corresponding signal to the central processing unit 81 to indicate that the backlight driving module 82 has received the corresponding control signal, thereby preventing the control of the first light source block 41 and the second light source block 42 from interfering with each other.

Specifically, the central processing unit 81 is also electrically connected to the screen driving module 83 to provide a liquid crystal control signal to the screen driving module 83.

It should be noted that after the screen driving module 83 receives the corresponding liquid crystal control signal, it can also feedback a corresponding signal to the central processing unit 81 to indicate that the screen driving module 83 has received the corresponding liquid crystal control signal, thereby preventing the control of the first liquid crystal layer 151 and the second liquid crystal layer 152 from interfering with each other.

In an embodiment, the electronic component 30 is disposed outside the first through hole 23 and on a side of the backlight module 20 away from the display unit 10.

It should be noted, the electronic component 30 comprises one or a combination of a camera, a flash, a light sensor, a breathing light sensor, a distance sensor, a fingerprint scanner sensor, a microphone sensor, and a transparent antenna sensor.

Figure 17:
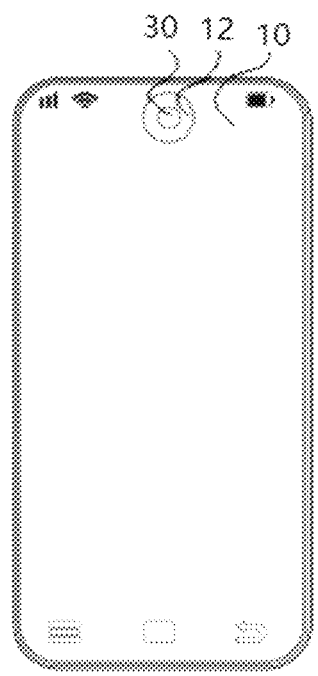
FIG. 17 is a schematic plan view of the display device of the present invention, in which a function additional region is circular.
Figure 18:
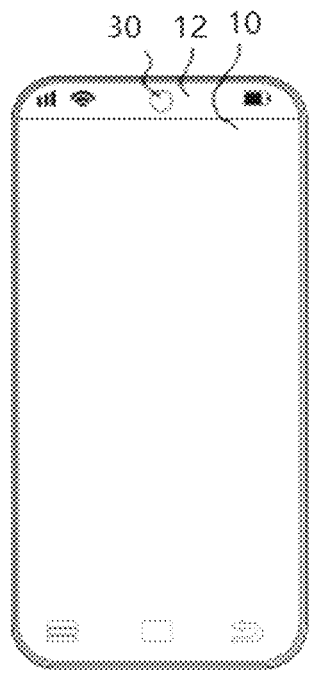
FIG. 18 is a schematic plan view of the display device of the present invention, in which the function additional region is rectangular.
Figure 19:
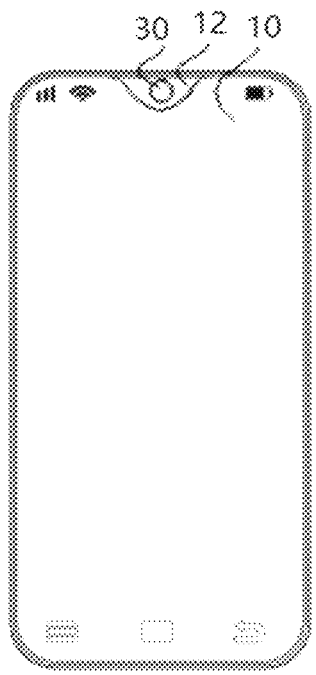
FIG. 19 is a top view showing a display effect of an electronic component of the display device in an opened state of the present invention.

Please refer to FIG. 17 to FIG. 19. In an embodiment, shapes of the first through hole 23 and/or the second through hole 70 are any one of bangs, widow's peak, waterdrop, circular, rectangular, or polygonal. A shape of the function additional region 12 is any one of bangs, widow's peak, waterdrop, circular, triangular, rectangular or polygonal.

Figure 20:
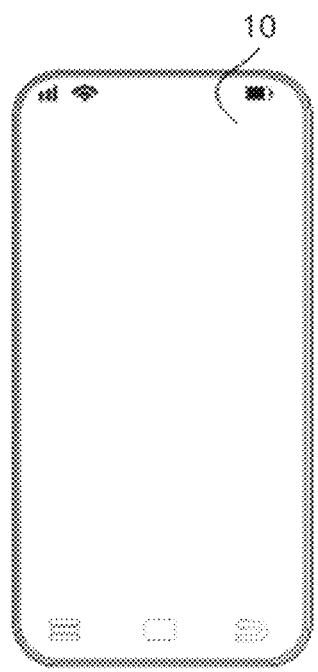
FIG. 20 is a top view showing the display effect of the electronic component of the display device in a closed state of the present invention.

Please refer to FIG. 19 and FIG. 20, taking the electronic component 30 as a camera as an example, FIG. 19 and FIG. 20 are top views of the display effects of the camera in on and off states, respectively. As shown in FIG. 19, when the camera is turned on, the display screen disappears and becomes transparent, and thus provides a lighting channel for the camera behind it. As shown in FIG. 20, when the camera is turned off, the screen is displayed, and the screen reaches full-screen display at this time.

It can be understood that the display device provided by the present invention may be other display devices with a display function, such as a mobile phone, a computer, a television, and a car display device, and the present invention is not specifically limited.

The beneficial effects of the present invention are: By setting the function additional region 12 in the region opposite to the electronic component 30, and using the first light source block 41 and the second light source block 42 to provide light sources for the main display region 11 and the function additional region 12 respectively, the function additional region 12 can be switched between the transparent state and the screen display state, which can realize full-screen display effect without damaging screen integrity and introducing new mechanical structures. Meanwhile, the first light source block 41 and the second light source block 42 are independently controlled, so that the main display region 11 and the function additional region 12 can display at the same time. Moreover, it can also be that when the main display region 11 displays normally, the function additional region 12 does not display the images, or when the function additional region 12 displays the images normally, the main display region 11 does not display the images.

In the above, various other corresponding changes and modifications can be made according to the technical solutions and technical ideas of the present invention to those skilled in the art, and all such changes and modifications are within the scope of the claims of the present invention.

What is claimed is:

1. A display panel, comprising:
   a display unit comprising a main display region and a function additional region, wherein at least a part of the function additional region is surrounded by the main display region; and
   a backlight module comprising a first light source block providing a light source for the main display region and a second light source block providing a light source for the function additional region, wherein the first light source block and the second light source block are independently driven and controlled;
   wherein the display unit is disposed on the backlight module, the display unit comprises a first substrate and a second substrate disposed opposite to each other, and a liquid crystal layer is disposed between the first substrate and the second substrate;
   wherein the liquid crystal layer comprises a first liquid crystal layer disposed in the main display region and a second liquid crystal layer disposed in the function additional region, and liquid crystals in the second liquid crystal layer are scattering type liquid crystals.

2. The display panel as claimed in claim 1, further comprising:
   a backlight driving module electrically connected to the first light source block and the second light source block;

wherein the backlight driving module is used to control the first light source block to be turned on when a first control signal is received; and wherein the backlight driving module is further used to control the second light source block to be turned on when a second control signal is received.

3. The display panel as claimed in claim 2, wherein the backlight driving module comprises a first driving module and a second driving module that are independent of each other;

the first driving module is electrically connected to the first light source block and is used to independently drive the first light source block according to the first control signal; and the second driving module is electrically connected to the second light source block and is used to independently drive the second light source block according to the second control signal.

4. The display panel as claimed in claim 1, further comprising a screen driving module, wherein the screen driving module is used to control a rotation of the liquid crystals in the liquid crystal layer when a liquid crystal control signal is received.

5. The display panel as claimed in claim 4, wherein when the backlight driving module controls the second light source block to be turned off, the screen driving module controls the liquid crystals in the second liquid crystal layer to rotate to a transparent state, and when the backlight driving module controls the second light source block to be turned on, the screen driving module controls the liquid crystals in the second liquid crystal layer to rotate to a scattering state.

6. The display panel as claimed in claim 4, wherein the screen driving module is further used to send a feedback signal to the backlight driving module according to an actual display brightness of the display unit when the actual display brightness of the display unit is different from a default display brightness, and the backlight driving module adjusts a light emission brightness of the first light source block and/or the second light source block according to the received feedback signal.

7. The display panel as claimed in claim 4, further comprising a printed circuit board electrically connected to the display unit, wherein the backlight driving module is mounted on the printed circuit board and is electrically connected to the printed circuit board to be electrically connected to signal lines in the display unit through the printed circuit board.

8. The display panel as claimed in claim 7, wherein the screen driving module is disposed at an edge region of the display unit, and the screen driving module is disposed close to the printed circuit board.

9. A driving method of a display panel, wherein the display panel comprises:

a screen driving module;

a display unit comprising a liquid crystal layer, a main display region and a function additional region, wherein the liquid crystal layer comprises a first liquid crystal layer disposed in the main display region and a second liquid crystal layer disposed in the function additional region; and a backlight module comprising a first light source block providing a light source for the main display region and a second light source block providing a light source for the function additional region, wherein the first light source block and the second light source block are independently driven and controlled;

wherein the driving method comprises following steps of:

S10, controlling the first light source block to turn on when a backlight driving module receives a first control signal; and S20, controlling the second light source block to turn on when the backlight driving module receives a second control signal;

wherein when the backlight driving module controls the second light source block to be turned off, the screen driving module controls liquid crystals in the second liquid crystal layer to rotate to a transparent state, and when the backlight driving module controls the second light source block to be turned on, the screen driving module controls the liquid crystals in the second liquid crystal layer to rotate to a scattering state.

10. The driving method of the display panel as claimed in claim 9, wherein in S20, when an electronic component corresponding to the function additional region is turned off and the function additional region is displaying, the backlight driving module receives the second control signal.

11. The driving method of the display panel as claimed in claim 10, further comprising following steps of:

S30, the backlight driving module receiving the third control signal and the backlight driving module controlling the second light source block to be turned off when the electronic component is turned on.

12. A display device, comprising:

an electronic component and a display panel, wherein the display panel comprises:

a display unit comprising a main display region and a function additional region, wherein at least a part of the function additional region is surrounded by the main display region; and a backlight module comprising a first light source block providing a light source for the main display region and a second light source block providing a light source for the function additional region, wherein the first light source block and the second light source block are independently driven and controlled;

wherein the electronic component is disposed corresponding to the function additional region of the display panel;

wherein when the electronic component is not operating and the second light source block is turned on, the function additional region displays a picture, and when the electronic component is operating and the second light source block is turned off, the function additional region does not display the picture.

13. The display device as claimed in claim 12, further comprising a central processing unit, wherein the central processing unit is electrically connected to the backlight driving module, and is used to send a second control signal to the backlight driving module when the electronic component is turned off and the function additional region is displaying.

14. The display device as claimed in claim 13, wherein the central processing unit is further used to send a third control signal to the backlight driving module when the electronic component is turned on, and the third control signal is used to control the backlight driving module to turn off the second light source block.

* * * * *